United States Patent
Bender et al.

(10) Patent No.: US 10,037,241 B2
(45) Date of Patent: Jul. 31, 2018

(54) CATEGORY DEPENDENT PRE-PROCESSOR FOR BATCH COMMANDS

(71) Applicant: INTERNATIONAL BUSINESS MACHINES CORPORATION, Armonk, NY (US)

(72) Inventors: Michael Bender, Rye Brook, NY (US); David J. Delia, Lagrangeville, NY (US); Wayne M. Delia, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 14/919,823

(22) Filed: Oct. 22, 2015

(65) Prior Publication Data

US 2017/0116069 A1    Apr. 27, 2017

(51) Int. Cl.
*G06F 11/00*    (2006.01)
*G06F 11/07*    (2006.01)
*G06F 17/30*    (2006.01)

(52) U.S. Cl.
CPC ........ *G06F 11/0793* (2013.01); *G06F 11/079* (2013.01); *G06F 11/0745* (2013.01);
(Continued)

(58) Field of Classification Search
CPC ............. G06F 11/0793; G06F 11/0745; G06F 11/0751; G06F 11/0787; G06F 11/079;
(Continued)

(56) References Cited

U.S. PATENT DOCUMENTS

| 5,327,559 A | 7/1994 | Priven et al. |
| 6,507,948 B1 | 1/2003 | Curtis et al. |

(Continued)

FOREIGN PATENT DOCUMENTS

| WO | WO9917240 | 4/1999 |
| WO | WO0203575 A1 | 1/2002 |

OTHER PUBLICATIONS

Baginski et al, Optimal Design of an N-Stage Nonlinear Transmission Line Based on Genetic Algorithm and LTspice, IEEE Transactions on Plasma Science, vol. 41, No. 8, 2013.

(Continued)

*Primary Examiner* — Bryce P Bonzo
*Assistant Examiner* — Anthony J Amoroso
(74) *Attorney, Agent, or Firm* — Patrick J. Daugherty; Driggs, Hogg, Daugherty & Del Zoppo Co., LPA (57) ABSTRACT

A category dependent pre-processor for categorizes each unprocessed command of a set of batch commands into one of four zone categories and processes them differentially according to the zone categories: ignoring errors while executing unprocessed commands within a first zone category; executing until encountering an error the unprocessed commands within the second zone category; not executing the unprocessed commands within the third zone category; and executing only those of the unprocessed commands identified as within a fourth zone category that have not been successfully executed within a specified time interval from a current time, thus not executing other, remaining ones of the unprocessed commands within the fourth zone category and that have been successfully executed within the specified time interval from the current time.

20 Claims, 5 Drawing Sheets

(52) U.S. Cl.
CPC ...... *G06F 11/0751* (2013.01); *G06F 11/0787* (2013.01); *G06F 17/30864* (2013.01)

(58) Field of Classification Search
CPC ......... G06F 17/30864; G06F 17/30563; G06F 17/30705; G06F 17/30722; G06F 17/30973; G06F 9/4881; G06F 9/4887; G06F 9/5027; G06F 9/5038
See application file for complete search history.

(56) References Cited

U.S. PATENT DOCUMENTS

| | | | |
|---|---|---|---|
| 6,640,226 B1 | 10/2003 | Shringeri et al. | |
| 7,640,533 B1 * | 12/2009 | Lottero | G06F 8/10 717/108 |
| 8,140,894 B2 * | 3/2012 | Thomson | G06F 8/30 714/15 |
| 8,549,353 B2 * | 10/2013 | Thomson | G06F 8/34 714/15 |
| 2008/0148261 A1 | 6/2008 | Ferlitsch | |
| 2011/0230991 A1 | 9/2011 | Case | |

OTHER PUBLICATIONS

Peter Mell et al, The NIST Definition of Cloud Computing, National Institute of Standards and Technology, U.S. Department of Commerce, Special Publication 800-145, 2011.
Chef, CHEFCONF2015, About Roles—Chef Docs, https://docs.chef.io/roles.html, 2015.
Chef, How Chef Works, Chef IT automation for speed and awsomeness, Chef Community Summit, 2015.

* cited by examiner

CATEGORY DEPENDENT PRE-PROCESSOR FOR BATCH COMMANDS

BACKGROUND

Public and private sector users and organizations generate large amount of information data items and objects that are amenable to Extract, Transform and Load (ETL) transactions to process, understand and otherwise utilize the underlying information. ETL refers to a process in database usage and especially in data warehousing that "extracts" data from homogeneous or heterogeneous data sources, "transforms" the data for storing it in a specified or desired format or structure for querying and analysis purposes, and "loads" the transformed data onto a designated target database destination, such as an operational data storage device (a "store"), a data warehouse, a data mart, etc. Some implementations perform (execute) all three ETL phases in parallel with respect to different data items, enabling resource and time efficiencies.

In development and testing of relational database modifications, batch command files are assembled and are tested in an iterative process until all errors are identified and corrected. Some of these commands, such as a table creation, when previously run successfully, will cause an error when an attempt is made to run the same command a subsequent time. These commands may not need to be repeated, and therefore should not be, in order to avoids such errors.

Prior art methods accommodate potential problems with recreating an already-existing table, such as the Structured Query Language ("SQL") command to "create if not exists" a table in some database management systems, such as MySQL™. (MYSQL is a trademark or registered trademark of Oracle and/or its affiliates in the United States or other countries.) Other prior art methods indicate that a subset of the commands should not be run, for example, by commenting out the commands to be bypassed.

BRIEF SUMMARY

In one aspect of the present invention, a method for a category dependent pre-processor for batch commands includes identifying (as a function of command metadata) respective ones of a set of zone categories for processing each of unprocessed commands of the batch commands. Each of the unprocessed commands are accordingly processed as a function of their identified zone categories by ignoring errors while executing the unprocessed commands identified as within a first of the zone categories (to generate non-zero return code); executing until encountering an error the unprocessed commands that are identified as within a second of the zone categories (to generate a non-zero return code); not executing the unprocessed commands that are identified as within a third of the zone categories, thereby not generating a zero or a non-zero return code; executing only those ones of the unprocessed commands identified as within a fourth of the zone categories that have not been successfully executed within a specified time interval from a current time; and not executing other, remaining ones of the unprocessed commands identified within the fourth zone categories and that have been successfully executed within the specified time interval from the current time.

In another aspect, a system has a hardware processor in circuit communication with a computer readable memory and a computer-readable storage medium having program instructions stored thereon. The processor executes the program instructions stored on the computer-readable storage medium via the computer readable memory and thereby identifying (as a function of command metadata) respective ones of a set of zone categories for processing each of unprocessed commands of the batch commands. Each of the unprocessed commands are accordingly processed as a function of their identified zone categories by ignoring errors while executing the unprocessed commands identified as within a first of the zone categories (to generate non-zero return code); executing until encountering an error the unprocessed commands that are identified as within a second of the zone categories (to generate a non-zero return code); not executing the unprocessed commands that are identified as within a third of the zone categories, thereby not generating a zero or a non-zero return code; executing only those ones of the unprocessed commands identified as within a fourth of the zone categories that have not been successfully executed within a specified time interval from a current time; and not executing other, remaining ones of the unprocessed commands identified within the fourth zone categories and that have been successfully executed within the specified time interval from the current time.

In another aspect, a computer program product for a category dependent pre-processor for batch commands has a computer-readable storage medium with computer readable program code embodied therewith. The computer readable program code includes instructions for execution which cause the processor to identify (as a function of command metadata) respective ones of a set of zone categories for processing each of unprocessed commands of the batch commands. Each of the unprocessed commands are accordingly processed as a function of their identified zone categories by ignoring errors while executing the unprocessed commands identified as within a first of the zone categories (to generate non-zero return code); executing until encountering an error the unprocessed commands that are identified as within a second of the zone categories (to generate a non-zero return code); not executing the unprocessed commands that are identified as within a third of the zone categories, thereby not generating a zero or a non-zero return code; executing only those ones of the unprocessed commands identified as within a fourth of the zone categories that have not been successfully executed within a specified time interval from a current time; and not executing other, remaining ones of the unprocessed commands identified within the fourth zone categories and that have been successfully executed within the specified time interval from the current time.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
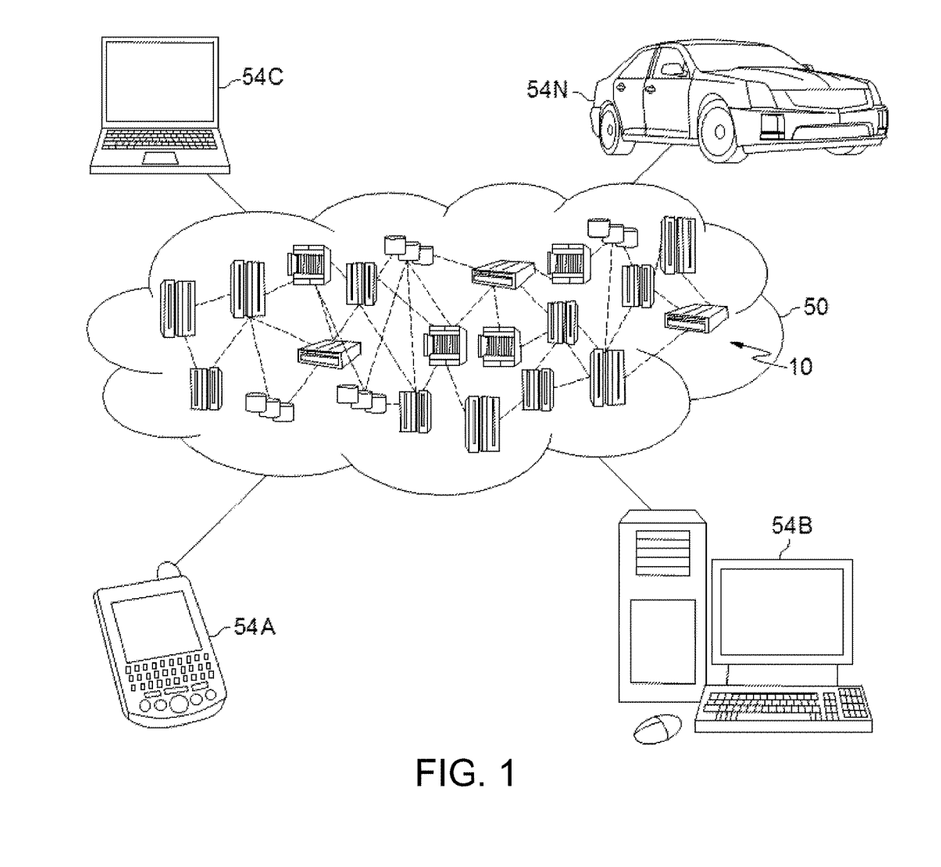
FIG. 1 depicts a cloud computing node according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
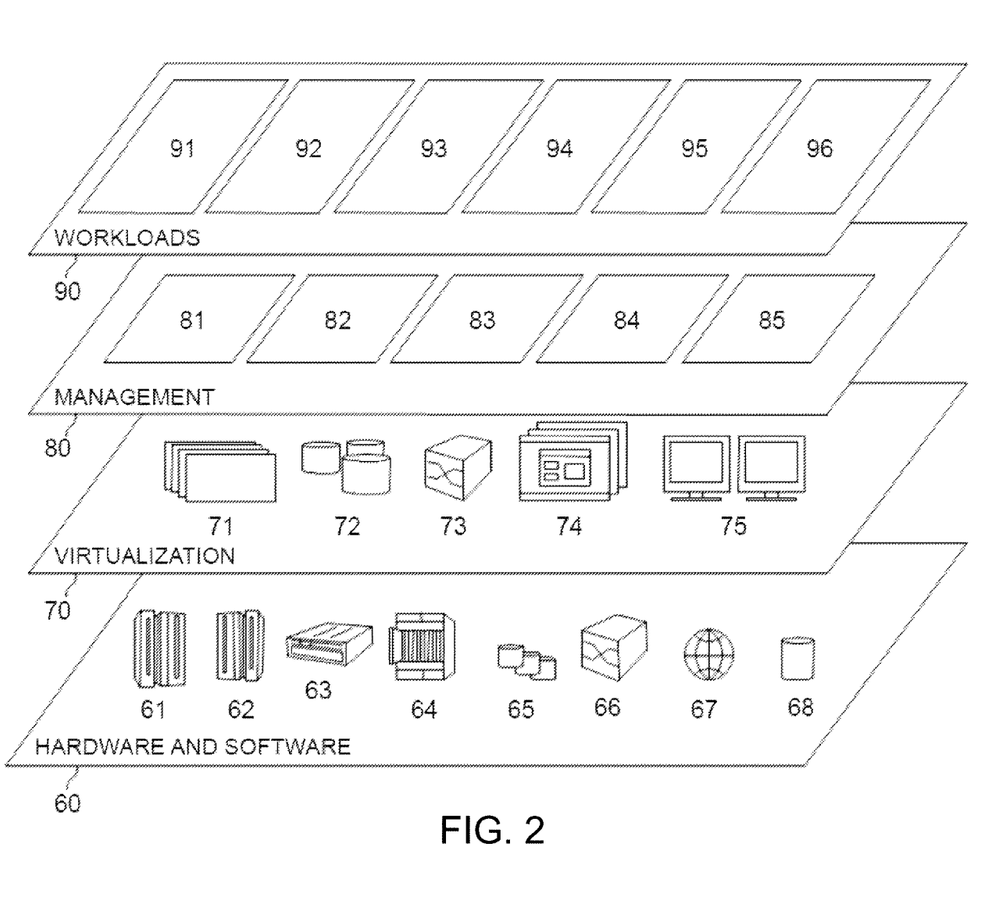
FIG. 2 depicts a cloud computing environment according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for a category dependent pre-processor for batch commands as described below.

Figure 3:
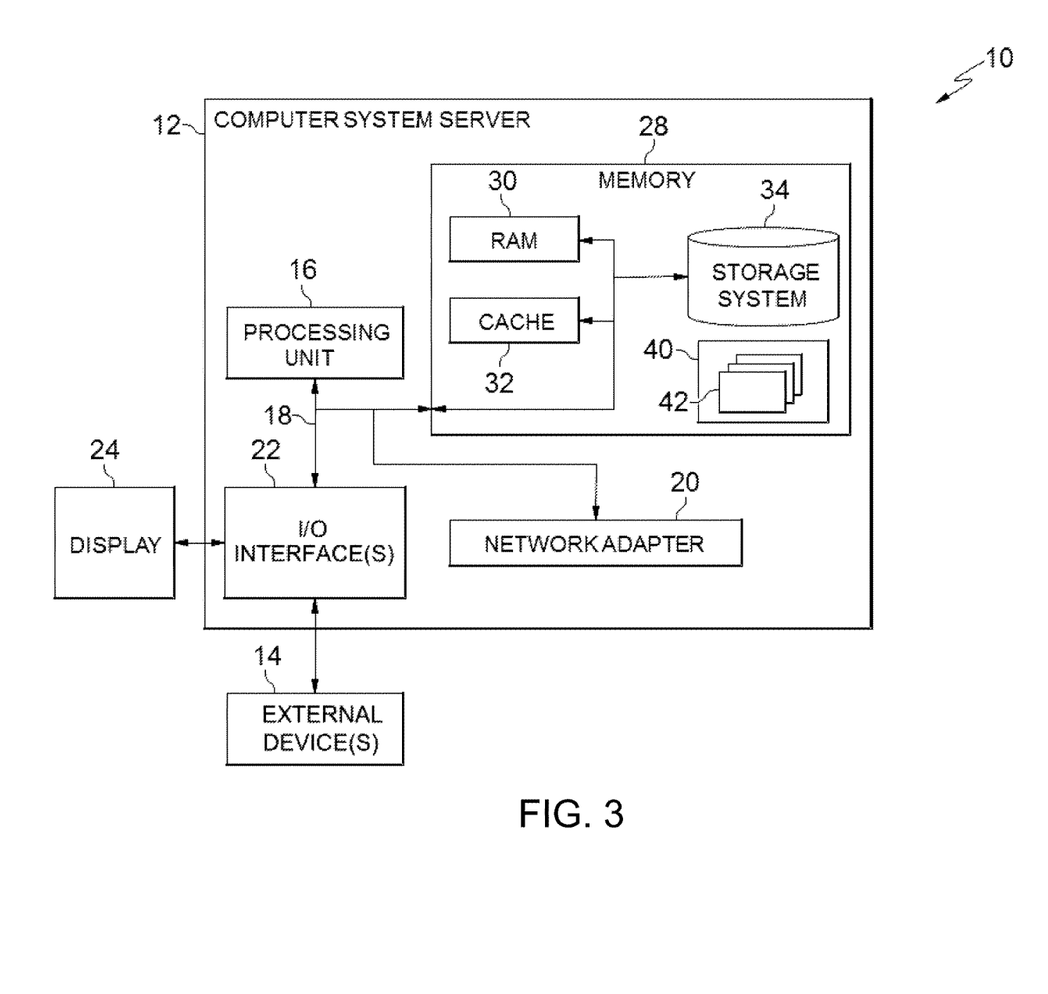
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As noted above, when batch command files are assembled and are tested in an iterative process until all errors are identified and corrected, some commands, when run successfully in a previous iteration, will cause an error when an attempt is made to run the same command in a subsequent iteration. Prior art techniques for avoiding this problem generally require textual modifications to the batch command files that must be removed before use in a pre-production or production environment. And while features of batch command file processing in database systems enable the issuance of a batch command with a parameter specifying whether to run all commands regardless of error, or to run commands until the first error is encountered, the prior are does not teach a method to combine these two running modes.

Figure 4:
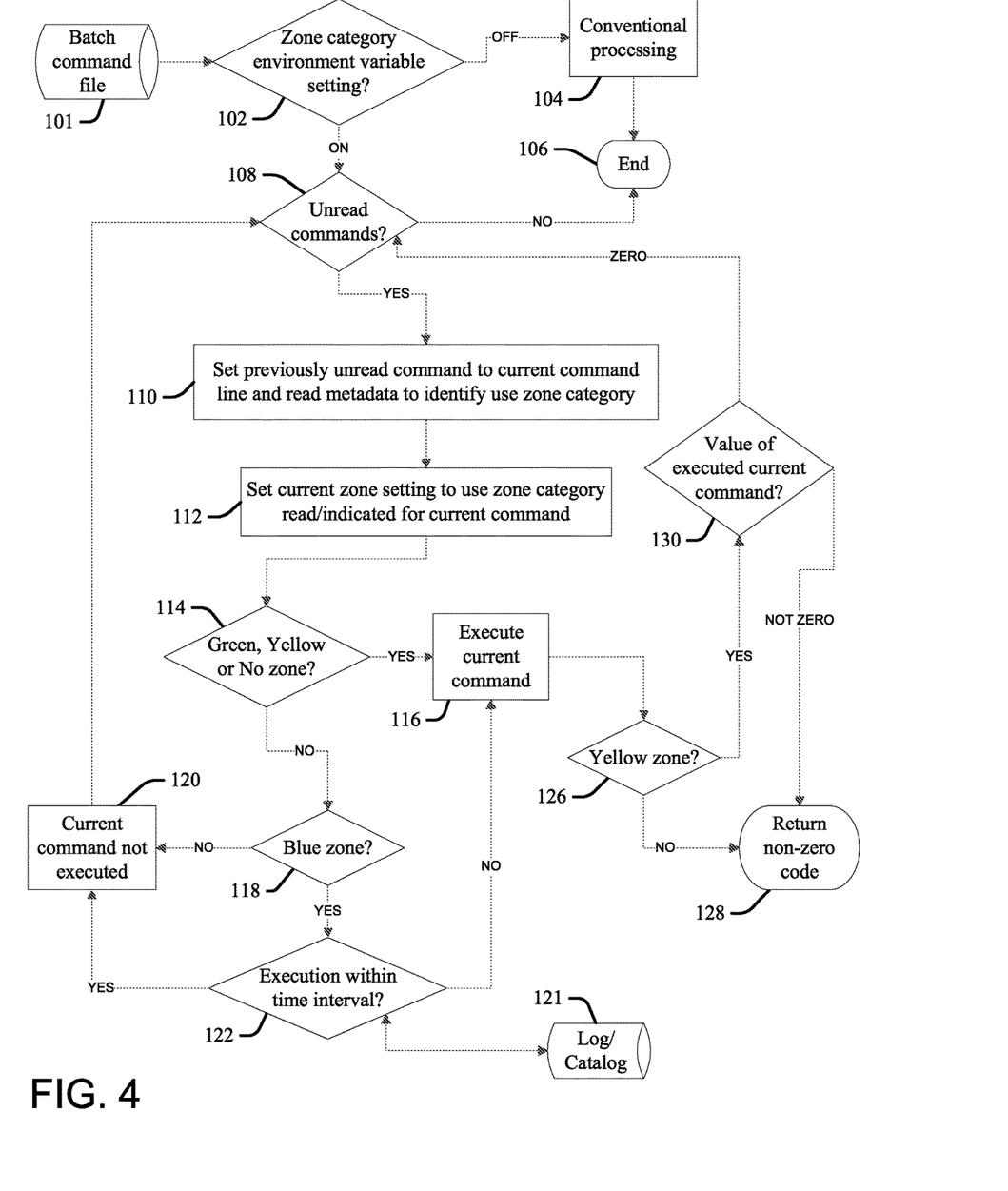
FIG. 4 is a flow chart illustration of a method or process according to an aspect of the present invention for a category dependent pre-processor for batch commands.

FIG. 4 (or "FIG. 4") illustrates a computer implemented (method or process) of an aspect of the present invention for a category dependent pre-processor for batch commands. A processor (for example, a central processing unit (CPU)) executes code, such as code installed on a storage device in communication with the processor, and thereby performs the process step elements illustrated in FIG. 4.

At 102, in response to an input 101 of a file of a set of (plurality of) batch commands for pre-processing (before submitting the batch commands to batch execution), it is determined whether a "use zone categories" environment variable is set to "on" or "off." If set to "off", then the commands are processed at 104 normally, as in a production environment, and the processing ends (exits) at 106.

If determined at 102 that the "use zone categories" environment variable is set to "on", then at 108 the batch command lines are reviewed to determine if any have not yet been read in a previous iteration of the present aspect. If not (all have already been read and processed), then the processing ends (exits) at 106. Otherwise, at 110 a previously unread command line of the batch commands is set to a current command line, and metadata of the current command line is read to determine if any use zone categories are indicated for the current command line from a set of four possible zone categories, in order to process the individual commands differentially, pursuant to different processes that are defined for different respective ones of the categories. More particularly, the zone categories include at least the following four categories:

a first zone category of commands that are always executed normally, ignoring errors (in the present example designated as a "Green Zone");

a second zone category of commands that are executed up until encountering a first error (in the present example designated as a "Yellow Zone");

a third zone category of commands that are not executed (in the present example designated as a "Red Zone"); and a fourth zone category of commands that are conditionally executed depending on whether the commands have or have not been recently successfully executed (in the present example designated as a "Blue Zone").

The differential processing for the different, respective categories is described as follows. At 112, if the use zone category read from or otherwise indicated by the current command line meta data does not match a "current" zone setting (as initialized, or as set from reading the metadata of a different one of the batch command lines during a previous iteration of the present aspect), then the current zone setting is set to the use zone category read or indicated for the current command line at 110. If none of the four zones are specified by the metadata at 110, then at 112 the current zone is set to (or remains at) the "no zone" or null setting.

At 114 the process or system determines whether the current zone setting (the zone category identified for the command being presently processed) is the first (green) zone, the second (yellow) zone or none (a "no zone" or null value), for example via a logical "OR" statement that is set to "TRUE" if any of these three values are met (are "TRUE"). If so, then at 116 the current command line is executed.

If at 114 the current zone is not any of the first (green) zone, second (yellow) zone or "no zone" values, then at 118 the process or system determines whether the current zone setting is the fourth (blue) zone. If not, then the current zone is the remaining third (red) zone category of commands that are not executed, and accordingly at 120 the current command is not executed and the process returns back to 108 to determine if any more of the commands are as of yet unread in previous iterations of the present aspect.

If at 118 the current zone is determined to be the fourth (blue) zone, at 122 transaction activity of system catalogs and/or database logs 121 are searched for any previous successful execution of the current command within a specified time interval from the current time (for example, within the last one minute, five minutes, ten minutes etc.). Successful execution may be indicated by creation or modifications of an object, such as a table. If the search indicates that the current command has been executed successfully within the time interval, then at 120 the current command is not executed and the process returns back to 108. Otherwise, at 116 the current command line is executed.

Subsequent to execution of the current command line at 116, the process or system determines at 126 whether the current zone setting is the second (yellow) zone. If not, then the zone is the green zone, or no zone, and the process exits with a non-zero return code for a processing output for the batch of commands at 128. Otherwise, if the yellow zone is current at 126, then the value of the return code from the execution of the current command line at 116 is evaluated at 130: if it is zero, then the process returns back to 108, otherwise the process exits with the non-zero return code at 128.

Figure 5:
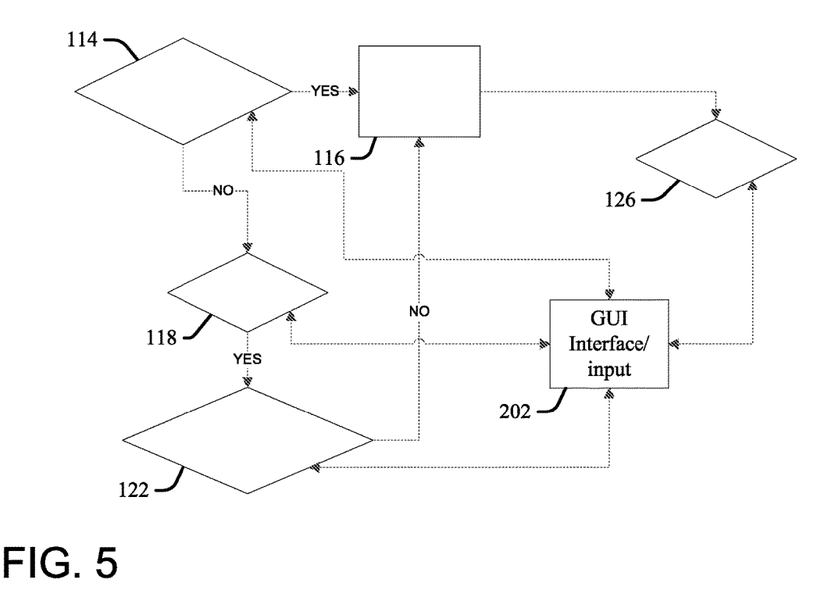
FIG. 5 is a flow chart illustration of a method or process according to another aspect of the present invention for a category dependent pre-processor for batch commands.

FIG. 5 illustrates another embodiment of the present invention wherein graphical user interface (GUI) 202 displays to a user the zone category determined for the current command line at one or more of the decision points 114, 118 and 126, or the specified time interval applied for the blue zone determination process at 122. (Some of the elements depicted in FIG. 4 are omitted to improve clarity in the figure, but it will be understood that each of the elements of FIG. 4 are also present in the embodiment depicted in FIG. 5). The GUI 202 enables inputs from the user to update or modify the zone categories or specified time interval for the blue zone process determined as the function of the batch command file metadata.

Thus, aspects of the present invention pre-process batch command files before submitting to batch execution, using meta-data (and optionally user feedback through GUI inputs) to divide the commands into one of the four defined categories, wherein the commands are then sequentially executed (or bypassed) according to their respective zone categories. Examples may focus on restarting batch files related to database administration, though aspects of the present invention may be applicable to restarting any batch executable file that creates or modifies objects with timestamps and audit trails.

In one example for a relational database management system the input file of batch commands (101, FIG. 4) is a Data Definition Language (DDL) file of DB2® SQL that is executable as a "restart-able" batch: it is able to rerun immediately, even after parts have been recently completed. (DB2 is a trademark of International Business Machines Corporation in the United States or other countries.) The determined "use zone categories" environment variable (at 102, FIG. 4) is named USE_ZONES, wherein if set to a positive value (for example, "Y", one, etc.) then the commands within the different designated zones are treated corresponding to the zone descriptions given above, as in a development environment; otherwise, if USE_ZONES is missing or set to a negative value ("N", zero, etc.), then the commands are processed normally as in a production environment. Thus, in some aspects the USE_ZONES environmental variable is changed (or removed) when the code is promoted from development to production, for example, to indicate that the zones are no longer be needed.

Aspects may be practiced in ETL and non-ETL batch streams, and extended to any processing request against a database manager, for example, to a COBOL ("COmmon Business-Oriented Language") or other program or application.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a category dependent pre-processor for batch commands, the method comprising executing on a computer processor the steps of:
   in response to an input of a file that comprises a plurality of batch commands, identifying, as a function of command metadata, ones of a set of zone categories for processing each of unprocessed commands of the batch commands; and
   processing each of the unprocessed commands as a function of their identified zone categories by:
   ignoring errors while executing the unprocessed commands that are identified as within a first of the zone categories, to generate non-zero return code;
   executing, until encountering an error, the unprocessed commands that are identified as within a second of the zone categories, to generate a non-zero return code;
   not executing the unprocessed commands that are identified as within a third of the zone categories, thereby not generating a zero or a non-zero return code;
   executing only ones of the unprocessed commands that are identified as within a fourth of the zone categories that have not been successfully executed within a specified time interval from a current time; and
   not executing other, remaining ones of the unprocessed commands that are identified as within the fourth of the zone categories and that have been successfully executed within the specified time interval from the current time.

2. The method of claim 1, further comprising:
   integrating computer-readable program code into a computer system comprising the processor, a computer readable memory in circuit communication with the processor, and a computer readable storage medium in circuit communication with the processor; and
   wherein the processor executes program code instructions stored on the computer-readable storage medium via the computer readable memory and thereby performs the steps of processing the unprocessed commands of the batch commands as the function of their identified zone categories by ignoring errors while executing unprocessed commands identified as within the first zone category, executing until encountering an error the unprocessed commands identified within the second zone category, not executing the unprocessed commands that are identified as within the third zone category, executing only ones of the unprocessed commands that are identified as within the fourth zone category and that have not been successfully executed within the specified time interval from the current time, and not executing the other, remaining ones of the unprocessed commands that are identified as within the fourth zone category that have been successfully executed within the specified time interval from the current time.

3. The method of claim 2, further comprising:
   providing the integrated computer-readable program code as a service in a cloud environment.

4. The method of claim 1, wherein the step of processing each of the unprocessed commands as the function of their determined zone categories comprises:
   executing a selected, current command of the unprocessed commands of the batch commands, in response to determining in a first determination that the zone category that is identified for the current command is the first zone category, the second zone category, or none of the first, second, third and fourth zone categories.

5. The method of claim 4, wherein the step of processing each of the unprocessed commands as the function of their determined zone categories comprises:
- in response to determining in the first determination that the zone category identified for the current command is not the first zone category and not the second zone category and is one of the third and the fourth zone categories, determining in a second determination whether the zone category identified for the current command is the fourth zone category; and
- in response to determining in the second determination that the zone category identified for the current command is not the fourth zone category, not executing the current command.

6. The method of claim 5, wherein the step of processing each of the unprocessed commands as the function of their determined zone categories comprises, in response to determining in the second determination that the zone category identified for the current command is the fourth zone category:
- searching transaction activity of at least one of system catalogs and database logs for a previous successful execution of the current command;
- executing the current command in response to the searching of the transaction activity not finding an occurrence of a previous successful execution of the current command within the specified time interval from a time of the searching of the transaction activity; and
- not executing and ending processing of the current command in response to the searching of the transaction activity finding an occurrence of a previous successful execution of the current command within the specified time interval from the time of the searching of the transaction activity.

7. The method of claim 5, wherein the specified time interval is ten minutes.

8. The method of claim 5, wherein the step of processing each of the unprocessed commands as the function of their determined zone categories comprises:
- subsequent to the step of executing the current command, determining in a third determination whether the zone category identified for the current command is the second zone category;
- in response to determining in the third determination that the zone category identified for the current command is not the second zone category, generating a non-zero return code for a processing output for the batch of commands; and
- in response to determining in the third determination that the zone category identified for the current command is the second zone category:
- processing a next one of the unprocessed commands of the batch commands in response to a value of zero of return code that is generated from the execution of the current command; and
- generating a non-zero return code for the processing output for the batch of commands in response to a value of non-zero of the return code that is generated from the execution of the current command.

9. The method of claim 8, further comprising:
- driving a graphical user interface display device that is in communication with the processor to indicate to a user the zone category identified for the current command; and
- modifying the zone category identified for the current command to a different one of the first, second, third and fourth zone categories in response to a user input via the graphical user interface display device; and
- wherein the step of processing the current unprocessed command is a function of the modified zone category.

10. A system, comprising:
- a processor;
- a computer readable memory in circuit communication with the processor; and
- a computer readable storage medium in circuit communication with the processor;
- wherein the processor executes program instructions stored on the computer-readable storage medium via the computer readable memory and thereby:
- in response to an input of a file that comprises a plurality of batch commands, identifies, as a function of command metadata, ones of a set of zone categories for processing each of unprocessed commands of the batch commands; and
- processes each of the unprocessed commands as a function of their identified zone categories by:
- ignoring errors while executing the unprocessed commands that are identified as within a first of the zone categories, to generate non-zero return code;
- executing, until encountering an error, the unprocessed commands that are identified as within a second of the zone categories, to generate a non-zero return code;
- not executing the unprocessed commands that are identified as within a third of the zone categories, thereby not generating a zero or a non-zero return code;
- executing only ones of the unprocessed commands that are identified as within a fourth of the zone categories that have not been successfully executed within a specified time interval from a current time; and
- not executing other, remaining ones of the unprocessed commands that are identified as within the fourth of the zone categories and that have been successfully executed within the specified time interval from the current time.

11. The system of claim 10, wherein the processor executes the program instructions stored on the computer-readable storage medium via the computer readable memory and thereby processes each of the unprocessed commands as the function of their determined zone categories by:
- executing a selected, current command of the unprocessed commands of the batch commands, in response to determining in a first determination that the zone category that is identified for the current command is the first zone category, the second zone category, or none of the first, second, third and fourth zone categories.

12. The system of claim 11, wherein the processor executes the program instructions stored on the computer-readable storage medium via the computer readable memory and thereby processes each of the unprocessed commands as the function of their determined zone categories by:
- in response to determining in the first determination that the zone category identified for the current command is not the first zone category and not the second zone category and is one of the third and the fourth zone categories, determining in a second determination whether the zone category identified for the current command is the fourth zone category; and
- in response to determining in the second determination that the zone category identified for the current command is not the fourth zone category, not executing the current command.

13. The system of claim 12, wherein the processor executes the program instructions stored on the computer-readable storage medium via the computer readable memory and thereby processes each of the unprocessed commands as the function of their determined zone categories, in response to determining in the second determination that the zone category identified for the current command is the fourth zone category, by:
- searching transaction activity of at least one of system catalogs and database logs for a previous successful execution of the current command;
- executing the current command in response to the searching of the transaction activity not finding an occurrence of a previous successful execution of the current command within the specified time interval from a time of the searching of the transaction activity; and
- not executing and ending processing of the current command in response to the searching of the transaction activity finding an occurrence of a previous successful execution of the current command within the specified time interval from the time of the searching of the transaction activity.

14. The system of claim 13, wherein the processor executes the program instructions stored on the computer-readable storage medium via the computer readable memory and thereby processes each of the unprocessed commands as the function of their determined zone categories by:
- subsequent to the step of executing the current command, determining in a third determination whether the zone category identified for the current command is the second zone category;
- in response to determining in the third determination that the zone category identified for the current command is not the second zone category, generating a non-zero return code for a processing output for the batch of commands; and
- in response to determining in the third determination that the zone category identified for the current command is the second zone category:
- processing a next one of the unprocessed commands of the batch commands in response to a value of zero of return code that is generated from the execution of the current command; and
- generating a non-zero return code for the processing output for the batch of commands in response to a value of non-zero of the return code that is generated from the execution of the current command.

15. The system of claim 14, wherein the processor executes the program instructions stored on the computer-readable storage medium via the computer readable memory and thereby processes each of the unprocessed commands as the function of their determined zone categories by:
- driving a graphical user interface display device that is in communication with the processor to indicate to a user the zone category identified for the current command; and
- modifying the zone category identified for the current command to a different one of the first, second, third and fourth zone categories in response to a user input via the graphical user interface display device; and
- processing the current unprocessed command as a function of the modified zone category.

16. A computer program product for a category dependent pre-processor for batch commands, the computer program product comprising:
- a computer readable storage medium having computer readable program code embodied therewith, wherein the computer readable storage medium is not a transitory signal per se, the computer readable program code comprising instructions for execution by a processor that cause the processor to:
- in response to an input of a file that comprises a plurality of batch commands, identify, as a function of command metadata, ones of a set of zone categories for processing each of unprocessed commands of the batch commands; and
- process each of the unprocessed commands as a function of their identified zone categories by:
- ignoring errors while executing the unprocessed commands that are identified as within a first of the zone categories, to generate non-zero return code;
- executing, until encountering an error, the unprocessed commands that are identified as within a second of the zone categories, to generate a non-zero return code;
- not executing the unprocessed commands that are identified as within a third of the zone categories, thereby not generating a zero or a non-zero return code;
- executing only ones of the unprocessed commands that are identified as within a fourth of the zone categories that have not been successfully executed within a specified time interval from a current time; and
- not executing other, remaining ones of the unprocessed commands that are identified as within the fourth of the zone categories and that have been successfully executed within the specified time interval from the current time.

17. The computer program product of claim 16, wherein the computer readable program code instructions for execution by the processor further cause the processor to process each of the unprocessed commands as the function of their determined zone categories by:
- executing a selected, current command of the unprocessed commands of the batch commands, in response to determining in a first determination that the zone category that is identified for the current command is the first zone category, the second zone category, or none of the first, second, third and fourth zone categories.

18. The computer program product of claim 17, wherein the computer readable program code instructions for execution by the processor further cause the processor to process each of the unprocessed commands as the function of their determined zone categories by:
- in response to determining in the first determination that the zone category identified for the current command is not the first zone category and not the second zone category and is one of the third and the fourth zone categories, determining in a second determination whether the zone category identified for the current command is the fourth zone category; and
- in response to determining in the second determination that the zone category identified for the current command is not the fourth zone category, not executing the current command.

19. The computer program product of claim 18, wherein the computer readable program code instructions for execution by the processor further cause the processor, in response to determining in the second determination that the zone category identified for the current command is the fourth zone category, process each of the unprocessed commands as the function of their determined zone categories by:
- searching transaction activity of at least one of system catalogs and database logs for a previous successful execution of the current command;
- executing the current command in response to the searching of the transaction activity not finding an occurrence of a previous successful execution of the current command within the specified time interval from a time of the searching of the transaction activity; and not executing and ending processing of the current command in response to the searching of the transaction activity finding an occurrence of a previous successful execution of the current command within the specified time interval from the time of the searching of the transaction activity.

20. The computer program product of claim 19, wherein the computer readable program code instructions for execution by the processor further cause the processor to process each of the unprocessed commands as the function of their determined zone categories by:

subsequent to the step of executing the current command, determining in a third determination whether the zone category identified for the current command is the second zone category;

in response to determining in the third determination that the zone category identified for the current command is not the second zone category, generating a non-zero return code for a processing output for the batch of commands; and in response to determining in the third determination that the zone category identified for the current command is the second zone category:

processing a next one of the unprocessed commands of the batch commands in response to a value of zero of return code that is generated from the execution of the current command; and generating a non-zero return code for the processing output for the batch of commands in response to a value of non-zero of the return code that is generated from the execution of the current command.

* * * * *